Patented Feb. 14, 1933

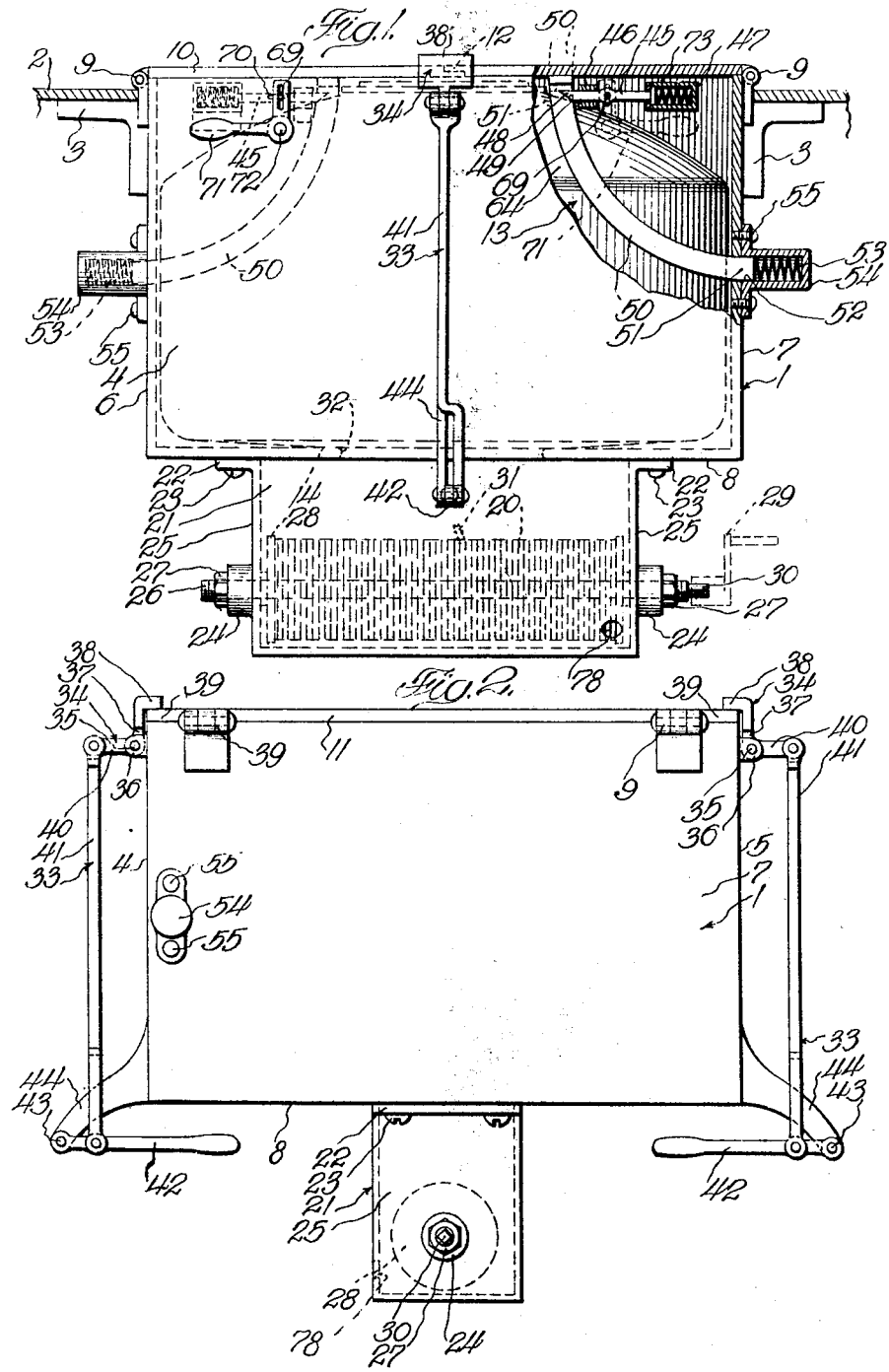

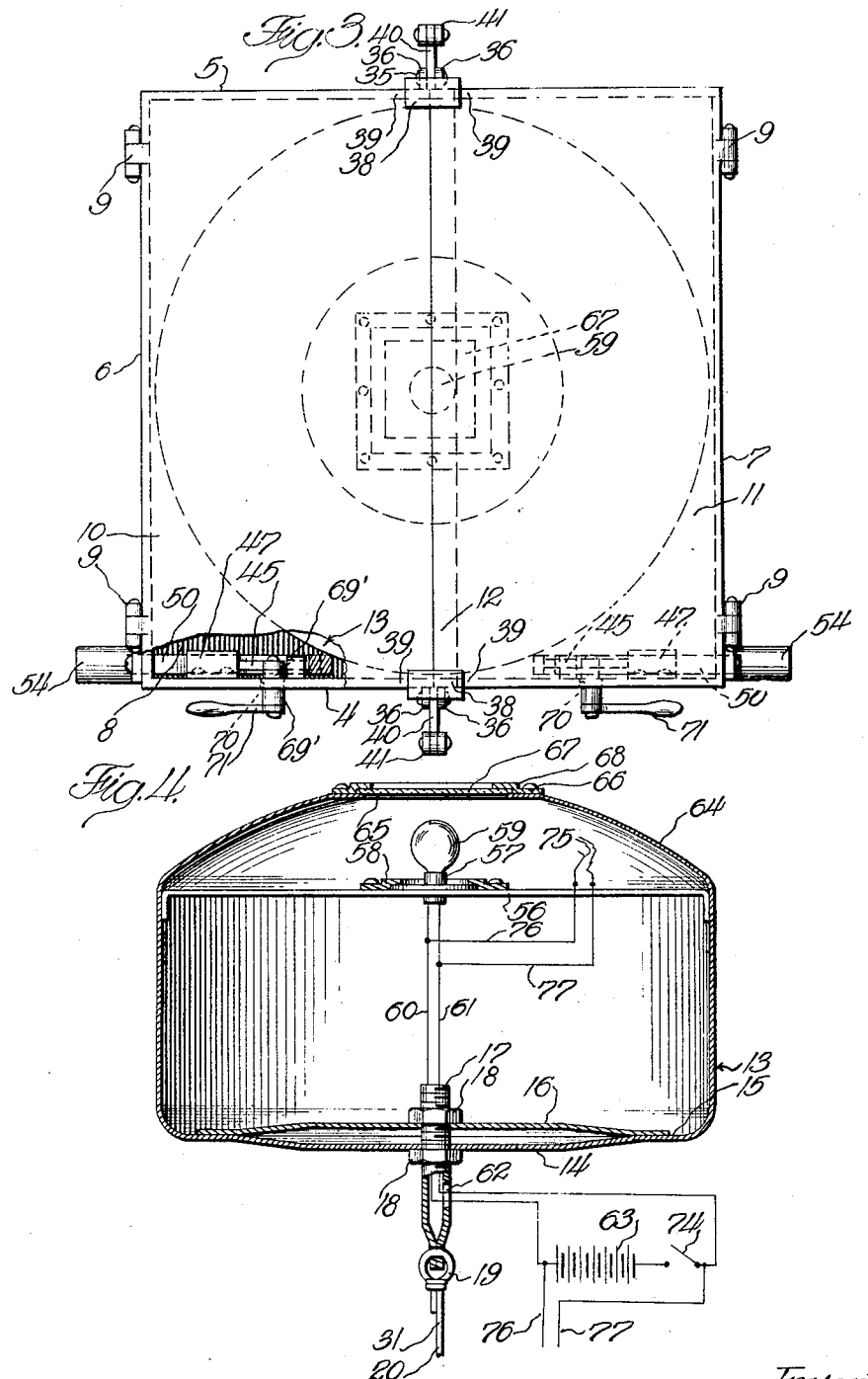

1,897,395

UNITED STATES PATENT OFFICE

FRIEDERICH MOWE, OF MELROSE PARK, ILLINOIS

MEANS FOR INDICATING THE POSITION OF SUBMARINE CRAFT

Application filed April 4, 1932. Serial No. 603,124.

This invention relates to means for indicating the position of submarine craft, and more particularly to an attachment for a submarine.

The general object of the invention is to provide a float device, which can be released from a submarine, if the same should sink, so that the float will rise to the surface, with means associated with the device whereby to signal passing ships or aeroplanes when the submarine is disabled and submerged or on the bottom of the ocean, and to provide for telephonic communication between the crew of the submerged craft and a rescuing party upon the surface of the water.

Another object of the invention is to provide a compartment for a float, and having hinged doors at the top thereof which are adapted to be locked in closed position, and which, when released from locked position will be urged toward open position to release the float.

Another object is to provide a hollow float at the top of which is arranged a sight opening through which a lamp is adapted to shine from within the float.

Another object is to provide a float compartment with hinged covers having overlapping connection, and which are adapted to be locked in closed position within the compartment and at opposite ends of the overlapping connection above the covers.

Other objects of the invention will appear in the course of the following specification and the accompanying drawings wherein like characters represent corresponding parts and in which:

Figure 1 is a front elevational view of the device in locked position and arranged within a submarine, with parts thereof broken away and shown in section.

Figure 2 is a side elevational view.

Figure 3 is a top plan with a portion of one of the covers broken away and its supporting arm shown in section, and Figure 4 is a vertical section of the float with the wiring connections shown diagrammatically.

In carrying out my invention I form a compartment 1, which may be attached to the deck of a submarine 2 in any suitable manner, as shown at 3.

The compartment 1 is rectangular in elevation, and square in plan, having a front wall 4, a rear wall 5, side walls 6 and 7, and a bottom wall 8. Hingedly connected to the side walls 6 and 7 as shown at 9 are covers 10 and 11 having overlapping connection as shown at 12.

Arranged within the compartment 1 and supported by the bottom wall 8 is a hollow float 13 being circular in plan and having a depressed bottom wall 14 to the inner face 15 of which is attached a reinforcing plate 16. The wall 14 and the plate 16 are perforated to receive a threaded sleeve 17 and adapted to be locked thereto by lock nuts 18. The sleeve 17 is flattened at one end as shown at 19 and is perforated to receive one end of a cable 20. At 21 is shown a drum housing having flanges 22 at its upper end adapted to be attached to the bottom wall 8 as shown at 23. The housing 21 is open at its top and has aligned perforated bosses 24 formed on the outer faces of the end walls 25 in which is rotatably mounted a shaft 26 and locked against longitudinal movement by the nuts 27. Arranged within the housing 21 upon the shaft 26 and fixed thereto is a drum 28 on which the cable 20 is adapted to be wound, the other end of which being attached to the drum 28. The cable 20 is of substantially great length and may be wound upon the drum by means of a crank 29 which may be attached to the squared end 30 of the shaft 26. The free end 31 of the cable 20 is adapted to extend through an opening 32 formed in the wall 8.

The overlapping end connection 12 of the covers 10 and 11 is adapted to be locked adjacent the front wall 4 and rear wall 5 by locking means 33. The locking means 33 comprises bell cranks 34 pivotally connected as at 35 to perforated ears 36 formed at the upper ends of the walls 4 and 5. One arm 37 of the bell cranks 34 has formed thereon an enlarged dog 38 adapted to normally rest upon the ends 39 of the covers 10 and 11, the other arm 40 of which is pivotally connected to the upper end of a link 41. The lower end of the link 41 is connected in close proximity to one end of a hand lever 42 pivotally connected as at 43 to an ear 44 formed at the lower end of the walls 4 and 5. The covers 10 and 11 are adapted to be locked from within the compartment 1 by means of spring pressed plungers 45 slidably arranged in guides 46 at one end and in spring housings 47 attached to the wall 4, at the other end. The plungers 45 are chamfered as shown at 48 and are adapted to engage a slot 49 formed in arcuate bars 50 attached at one end to the covers 10 and 11 in any suitable manner, whereby to hold the covers in locked position. The other end 51 of the bars 50 is adapted to protrude through a slot 52 formed in the walls 6 and 7 and abut a compression spring 53 arranged in housings 54 attached to the walls 6 and 7 as shown at 55. The plungers 45 have attached thereto transverse pins 69 slidably arranged in slots 70 formed in the wall 4 and which extend therethrough for slidable connection with a slotted bell crank hand lever 71 pivotally connected to the wall 4 at 72, spacing washers being shown at 69'.

Within the float 13 and attached thereto at its upper end in any suitable manner is a supporting plate 56 upon which is arranged a flanged socket 57. The socket 57 is attached to the plate 56 by means of a locking plate 58, and has arranged therein a lamp 59. Lead wires 60 and 61 are adapted to extend from the socket 57 down through the sleeve 17 and out through an opening 62 in the sleeve 17 to a battery 63.

The upper wall 64 of the float 13 is curved upwardly and inwardly and has an opening 65 formed therein adapted to be closed by a transparent plate 66 attached to the upper face 67 of the wall 64 by an attaching plate 68. When it is desired to release the float 13, the hand levers 42 are pulled downwardly thereby rocking the bell cranks 34 to release the dogs 38 from the covers 10 and 11.

The hand levers 71 are then pulled downwardly thereby moving the pins 69 to release the plungers 45 from the arms 50 against the tension of the springs 73. Upon release of the arms 50 by the plungers 45 the arms 50 are forced outwardly by the springs 53 and the covers in turn moved toward open position. Upon release of the covers 10 and 11 when the submarine is submerged, the water will flow into the compartment 1 around the float 13 thereby causing the same to rise out of the compartment 1 to the surface of the water. The covers 10 and 11 will be moved to vertical position by the pressure of the water and float, and will be held in open position by virtue of the ends 51 resting upon the plungers 45 as shown in dotted lines in Figure 1.

When the float 13 is released a switch 74 in the electric circuit may be closed to light the lamp 59, whereby, when the float is at the surface, the rays of light from the lamp 59 will flow through the plate 67 to signal passing ships or planes as to the location of the submarine in distress.

The float 13 has suitably arranged therein telephone contacts 75 which may be tapped to the light circuit by leads 76 and 77, whereby when the float is reached by a rescue party and the glass plate 67 broken, a telephone plug may be connected thereto to establish telephone communication between the rescue party and the crew of the submarine to determine the best method of salvaging the submerged craft.

The leads 60 and 61 may be braided with the cable 20 and wound on the drum 28 and extend outwardly of the housing through a suitable opening 78 therein for suitable electrical connection in the craft. From the foregoing it will be seen that I have provided a simple and efficient device and it is to be understood that various changes may be made in the details of construction without departing from the spirit of the invention or the appended claims.

Having thus described my invention, what I claim is:

1. A submarine boat having, in combination, a compartment carried by its deck and projecting thereabove, a float loosely fitted in said compartment, said compartment having opposed hinged doors, slotted arcuate arms attached to said doors, spring urged plungers adapted to releasably engage said slots whereby to lock said doors in closed position, springs adapted to engage said arms whereby to urge said doors toward open position upon release of said plungers from said slots, said doors having overlapping connection, pivotal dogs adapted to engage the ends of said overlapping connection, and a hand lever having link connection to said dog whereby said dog may be moved to unlocked position.

2. In a submarine boat having, in combination, a float compartment, a hollow float loosely fitted in said compartment, a housing attached to the bottom of said compartment, a drum rotatably mounted in said housing, a cable wound around said drum, a sleeve mounted in the bottom of said float and having a flattened perforated end portion, the free end of said cable attached thereto, said sleeve having an opening in one side adjacent said flattened portion, a lamp mounted within the float, a source of electricity, and leads from said lamp extending into said sleeve and out of said opening to said source of electricity.

3. In a device of the class described, a hollow float having a restricted opening at the top thereof, a transparent plate adapted to close said opening, means for securing said plate to said float, a lamp supported within said float in close proximity to said plate, a depressed bottom wall, a reinforcing plate secured to said wall and spaced therefrom, a sleeve having an opening therein, means for locking said sleeve to said supporting plate and bottom wall, and leads from said lamp extending through said sleeve and out of said opening to a source of electricity.

In witness whereof, I have hereunto set my hand this 11th day of March, A. D. 1932.

FRIEDERICH MOWE.